(12) United States Patent
Geen

(10) Patent No.: US 6,516,651 B1
(45) Date of Patent: Feb. 11, 2003

(54) CORIOLIS EFFECT TRANSDUCER

(75) Inventor: John Albert Geen, Tewksbury, MA (US)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 09/359,477

(22) Filed: Jul. 22, 1999

(51) Int. Cl.⁷ .......................... G01P 21/00; G01F 25/00
(52) U.S. Cl. ................ 73/1.16; 73/1.38; 73/504.02; 73/861.356
(58) Field of Search ............... 73/1.16, 861.354, 73/861.355, 861.356, 861.357, 1.27, 1.34, 504.02, 504.04, 1.38

(56) References Cited

U.S. PATENT DOCUMENTS

| | | | |
|---|---|---|---|
| 4,660,421 A | * 4/1987 | Dahlin et al. | 73/861.356 |
| 4,823,613 A | 4/1989 | Cage et al. | 73/861.38 |
| 4,823,614 A | * 4/1989 | Dahlin | 73/861.356 |
| 4,870,588 A | * 9/1989 | Merhov | 73/504.02 X |
| 5,027,662 A | * 7/1991 | Titlow et al. | 73/861.356 |
| 5,460,053 A | 10/1995 | Lew et al. | 73/861.38 |
| 5,602,344 A | * 2/1997 | Lew et al. | 73/861.356 |
| 5,635,640 A | 6/1997 | Geen | 73/504.12 |
| 5,796,012 A | 8/1998 | Gomi et al. | 73/861.357 |
| 5,869,760 A | 2/1999 | Geen | 73/504.12 |
| 6,122,961 A1 | * 1/2001 | Mattar | 73/861.357 |
| 6,178,828 B1 | * 1/2001 | Mettar | 73/861.357 |
| 6,293,157 B1 | * 9/2001 | Ma et al. | 73/861.354 |
| 6,327,914 B1 | * 12/2001 | Dutton | 73/861.356 |
| 6,343,517 B1 | * 2/2002 | Van Cleve et al. | 73/861.357 |
| 6,378,354 B1 | * 4/2002 | Sharp | 73/1.16 |

* cited by examiner

Primary Examiner—Thomas P. Noland
(74) Attorney, Agent, or Firm—Samuels, Gauthier & Stevens, LLP

(57) ABSTRACT

A method for testing a Coriolis transducer having a mass adapted vibrate along a vibratory direction in a resonant structure and undergo a displacement along a sensitive axis, perpendicular to the vibration, in response to an angular rate about a mutually perpendicular rate sensing axis. In the absence of an angular rate about the rate sensing axis, forces, $F_{TEST\ VIBRATORY}$ and $F_{TEST\ SENSITIVE}$ are applied on the mass along the direction of vibration and along the sensitive axis, respectively, in a predetermined ratio, N. The output $V_{OUT\ TEST}$ of the transducer is measured in response to the forces, $F_{TEST\ VIBRATORY}$ and $F_{TEST\ SENSITIVE}$.

4 Claims, 8 Drawing Sheets

CORIOLIS EFFECT TRANSDUCER

BACKGROUND OF SUMMARY OF THE INVENTION

This invention relates generally to Coriolis effect transducers and more particularly to test, or calibration, structures for such transducers.

As is known in the art, Coriolis effect transducers are used to measure angular rate. More particularly, if a mass, m, with velocity, v, relative to the body of the transducer, experiences an angular rate $\Omega_{IN}$ about a rate sensing axis perpendicular to the velocity of the mass, the mass will experience a Coriolis acceleration, $A_{COR}=2v\Omega_{IN}$, along a sensitive axis perpendicular to both the velocity, v, and the rate sensing axis. Thus, a Coriolis force $F_{COR}$ is produced on the mass equal to $mA_{COR}$ along the sensitive axis. The motion of the mass is restrained in the direction of the Coriolis force by a mechanical or electrical restraint, such as a mechanical spring or electrical servomechanism. The mass will undergo a displacement $y=F_{COR}/k$, along the sensitive axis, where k is a constant, such as the spring constant or reciprocal of the spring compliance. This displacement y may be measured by any displacement transducer, such as, for example, a device which measures difference in capacitance produced by a linear change in a gap (i.e., displacement) between plates of a capacitor, one of such plates being mechanically coupled to the mass and the other being fixed relative to the body of the transducer. The device then produces an electrical output signal $V_{OUT}$ proportional to this change in capacitance. Thus, such a Coriolis transducer produces an output electrical signal, $V_{OUT}=K\Omega_{IN}$, where K is a proportionality constant which is a function of the physical and electrical properties of the transducer.

In order to determine K, a calibration procedure is used. Such calibration procedure typically includes setting the transducer on a rate table and applying a known input angular rate, $\Omega_{IN\ TEST}$, about the rate sensing axis while the output signal $V_{OUT\ TEST}$ is measured. The proportionality constant, K, is determined in accordance with $K=V_{OUT\ TEST}/\Omega_{IN\ TEST}$. While this calibration procedure provides a determination of K, it is time consuming and therefore adds cost to the transducer.

As is also known in the art, one technique used to provide relatively inexpensive Coriolis transducers is micromachining. One such micromachined Coriolis transducer is described in my U.S. Pat. No. 5,635,640 issued Jun. 6, 1995, the entire subject matter thereof being incorporated into this patent application.

It is also very useful to be able to verify the quantitative functionality of a packaged Coriolis sensor in its end use. Specifically, when such sensors are used for automotive rollover or anti-skid applications they become safety-critical items and it enhances their usefulness if their correct function can be established with high confidence every time they are used. As will be described, this invention provides a means of testing that function with high confidence.

In accordance with the present invention, a method is provided for testing a Coriolis transducer having a body with a mass, m, vibrate along a vibratory direction in a resonant structure and undergo a displacement along a sensitive axis in response to an angular rate about a rate sensing axis. The displacement is perpendicular to both the vibration and the rate sensing axis. The method includes: applying forces, $F_{TEST\ VIBRATORY}$ and $F_{TEST\ SENSITIVE}$, on the mass along the direction of vibration and along the sensitive axis, respectively, in a predetermined ratio, N; and, measuring an incremental output $V_{OUT\ TEST}$ of the transducer in response to the forces, $F_{TEST\ VIBRATORY}$ and $F_{TEST\ SENSITIVE}$. The $F_{TEST}$ vibratory is identical to the vibratory drive force in normal operation.

With such method, a known test input angular rate $\Omega_{IN\ TEST\ SIM}$ is simulated, such rate, $\Omega_{IN\ TEST\ SIM}$, being a known function of a measured characteristic frequency of the resonant structure. Thus, the proportionality constant $K=V_{OUT}/\Omega_{IN}=V_{OUT\ TEST}/\Omega_{IN\ TEST\ SIM}$ can be calculated without expensive rate table testing. Further, because the test can be performed with a transducer prior to packaging, electronics integrally formed on the same semiconductor wafer of the mechanical transduction structure may be easily trimmed to provide a desired proportionality constant K.

In accordance with another feature of the invention, the mass of the transducer is included in a resonant structure. During a test, or calibration, mode, with the forces, $F_{TEST\ VIBRATORY}$ and $F_{TEST\ SENSITIVE}$ having a frequency at, or near the resonant frequency of the mass, and in the absence of an input angular rate about the rate sensing axis, the velocity of the mass will be predominately $F_{TEST\ VIBRATORY}/D$, where D is the damping factor of the body within the resonant structure. Thus, under such condition, a simulated input angular rate, $\Omega_{IN\ TEST\ SIM}=\{F_{TEST\ SENSITIVE}/F_{TEST\ VIBRATORY}\}\{BW/2\}$, where BW is the resonant bandwidth of the resonance structure is applied to the transducer. In response to such simulated input angular rate, $\Omega_{IN\ TEST\ SIM}=\{F_{TEST\ SENSITIVE}/F_{TEST\ VIBRATORY}\}\{BW/2\}$, the output of the transducer $V_{OUT\ TEST}$ will be $K\{BW\}/2N$; i.e., $K=2N\{V_{OUT\ TEST}\}/BW$. Because the mechanism used to apply the vibratory force, $F_{TEST\ VIBRATORY}$, on the mass along the vibratory direction and the mechanism used to apply the force to the mass along the sensitive axis, $F_{TEST\ SENSITIVE}$, are fabricated in proximate regions of the transducer, they have matched physical and electrical characteristics. Thus, manufacturing variations incurred in the formation of one of the force mechanisms occur to the other one of the force mechanisms with their size ratio, N, being independent of such manufacturing variations. As a consequence, with the vibratory direction force to sensitive axis force ratio, $N=F_{TEST\ VIBRATORY}/F_{TEST\ SENSITIVE}$, being related to the ratio of the sizes of the mechanisms, rather than to the absolute size of each one of the mechanisms, such ratio, N, can be accurately fixed by the design of the structure. In short, the ratio N is independent of manufacturing tolerance. The remaining parameter, the resonance bandwidth, BW, of the resonant structure, is readily and quickly ascertainable from a frequency response measurement of the resonant structure. While the resonance bandwidth, BW, changes with manufacturing variations, it is measurable from a frequency response measurement which does not require application of a known input angular rate to the transducer.

In one embodiment, the vibratory direction force mechanism, $F_{TEST\ VIBRATORY}$, during both the normal mode and the test mode, and the sensitive axis force mechanism, $F_{TEST\ SENSITIVE}$, used during the test mode, are electrostatically driven fingers. Thus, N is merely the ratio of the number of fingers used to produce $F_{TEST\ SENSITIVE}$ to the number of fingers used to produce $F_{TEST\ VIBRATORY}$. Consequently, an accurate determination of the proportionality constant, K is achieved.

In accordance with another embodiment of the invention, during the test mode, the forces $F_{TEST\ SENSITIVE}$ and $F_{TEST\ VIBRATORY}$ are applied with a frequency, $\omega_{APPLIED}$, less than the natural resonant frequency, $\omega_o$. In such case, the simulated $\Omega_{IN\ TEST\ SIM}=\{\omega_o^2\}/\{2N\omega_{APPLIED}\}$, in which case the natural frequency $\omega_o$ is measured and used for the calibration (i.e., the characteristic frequency of the resonant structure measured and used for the calibration is the natural frequency $\omega_o$). In particular, the proportionality constant $K=V_{TEST\ OUT}/\Omega_{IN\ TEST\ SIM}=\{2N\omega_{APPLIED}/\Omega_o^2\}\{V_{TEST\ OUT}\}$ is determined when the vibratory direction and sensitive axis forces, $F_{TEST\ VIBRATORY}$ and $F_{TEST\ SENSITIVE}$, respectively, are applied to the transducer in ratio, N, with $\Omega_{IN}=0$, and $V_{TEST\ OUT}$ is measured at the output of the transducer.

In another embodiment of the invention, during the test mode, the forces $F_{TEST\ SENSITIVE}$ and $F_{TEST\ VIBRATORY}$ are applied with a frequency, $\omega_{APPLIED}$, greater than the natural resonant frequency, $\omega_o$, the simulated $\Omega_{IN\ TEST\ SIM}=\omega_{APPLIED}/2N$, in which case the characteristic frequency used for the calibration is $\omega_{APPLIED}$. In particular, the proportionality constant $K=\{2N/\omega_{APPLIED}\}\{V_{TEST\ OUT}\}$ is determined when the sensitive direction and the vibratory axis forces, $F_{TEST\ VIBRATORY}$ and $F_{TEST\ SENSITIVE}$, respectively, are applied in ratio, R, to the transducer, with $\Omega_{IN}=0$, and $V_{TEST\ OUT}$ is measured at the output of the transducer.

In accordance with another aspect of the invention the vibratory direction force mechanism and the sensitive axis force mechanism are in proximate regions of the transducer.

In accordance with still another aspect of the invention, the vibratory direction force mechanism the sensitive axis force mechanism have matched physical and electrical characteristics.

In accordance with another aspect of the invention, a Coriolis transducer is provided. The transducer includes a resonant structure having a mass vibrate along a vibratory direction in a resonant structure and undergo a displacement along a sensitive axis, perpendicular to the vibration, in response to an angular rate about a rate sensing axis, such displacement being perpendicular to both the vibration and the rate sensing axis. The transducer includes a vibratory direction force mechanism adapted to apply a vibratory direction force, $F_{TEST\ VIBRATORY}$, on the mass along the vibratory direction during both a normal operating mode and during a test mode. Also provided is a sensitive axis force mechanism adapted to apply simultaneously to the vibratory direction force, a force, $F_{TEST\ SENSITIVE}$, to the mass along the sensitive axis when such sensitive axis force mechanism is coupled to the mass. A switch is included to couple the sensitive axis force mechanism to the mass during a test mode and being adapted to de-couple the sensitive axis force mechanism from the mass during a normal operating mode.

DESCRIPTION OF THE PREFERRED EMBODIMENTS

Figure 1:
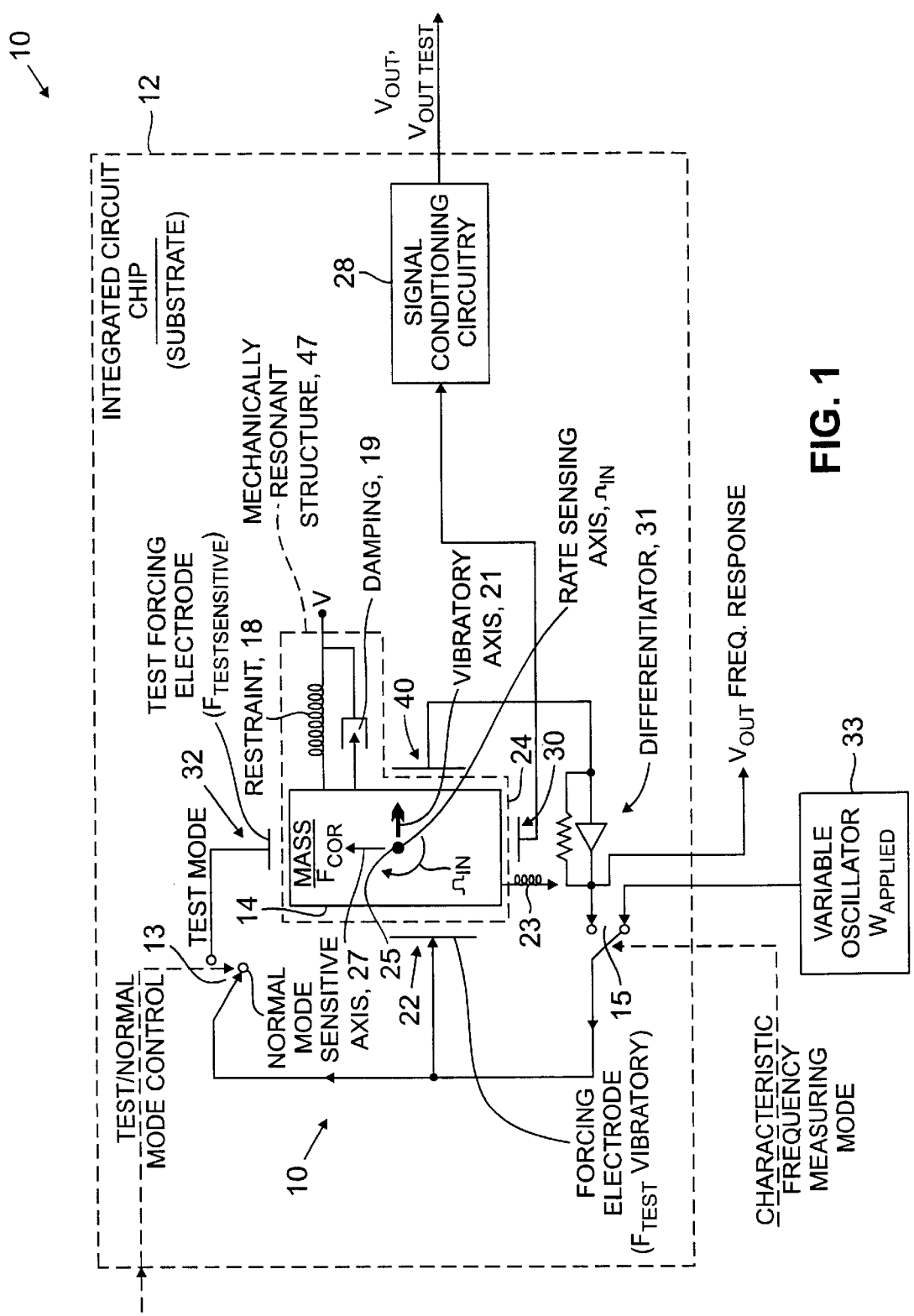
FIG. 1 is a schematic diagram useful in understanding the operation of a Coriolis transducer according to the invention.

Referring to FIG. 1, a schematic diagram useful in understanding the operation of a micromachined Coriolis transducer 10 according to the invention is shown. The transducer 10 is micromachined on a single crystal semiconductor, here silicon, substrate 12. The transducer 10 includes a body, or mass 14. The transducer 10 has a pair of switches 13, 15. During a normal operating mode, switch 13 is open, as shown, and switch 15 couples an input vibratory direction force mechanism 22, here forcing electrodes, to a vibratory axis output sensing mechanism 40, here sensing electrodes, in a positive feedback relationship provided by a differentiator 31. Such positive feedback loop causes the mass 14 to resonate in a resonant structure 47 at a resonant frequency $\omega_o$. In such normal operating mode, the mass 14 vibrates with a velocity, v, relative to the substrate 12 of the transducer 10. As will be described, the velocity, v, is a function of the resonant bandwidth, BW, of the resonant structure 47. Whenever the vibrating mass 14 experiences an angular rate $\Omega_{IN}$ about an rate sensing axis 25 perpendicular to the direction of motion of the mass, here a linear motion along vibrating axis 21, the mass 14 will experience a Coriolis acceleration, $A_{COR}=2v\Omega_{IN}$, along a sensitive axis 27. The sensitive axis 27 is perpendicular to both the velocity, v, (i.e., the vibratory direction, here axis 21) and the rate sensing axis 25. Thus, a Coriolis force $F_{COR}$ is produced on the mass 14 along the sensitive axis 27 equal to $mA_{COR}$, where m is the mass 14.

The motion of the mass 14 is restrained in the direction of the Coriolis force by a mechanical or electrical restraint, such as a mechanical spring or electrical servomechanism, here represented by a mechanical spring-type restraint 23. The mass will undergo a displacement $y=F_{COR}/k$, along the sensitive axis 27, where k is a constant, here the spring constant (i.e, the reciprocal of the spring compliance) of the spring-like restraint (i.e, flexures 23). This displacement y may be measured by any displacement transducer, such as, for example, a device which measures difference in capacitance produced by the displacement linearly changing a gap 24 between plates (i.e., sensing electrodes of sensitive axis output sensing mechanism 30) of a differential capacitor, one of such plates being mechanically coupled to the mass 14 and the other being fixed relative to the substrate 12 of the transducer 10. The device (e.g., sensing electrodes of sensitive axis output sensing mechanism 30) then produces an electrical output signal $V_{OUT}$ from signal conditioning circuitry 28. The output signal, $V_{OUT}$, is proportional to the change in capacitance. Thus, such a Coriolis transducer 10 produces an output electrical signal, $V_{OUT}=K\Omega_{IN}$, where K is a proportionality constant which is a function of the physical and electrical properties of the transducer 10. The proportionality constant, K, is determined by a test procedure and structure to be described. Suffice it to say here, however, the test does not require application of a known input angular rate, $\Omega_{IN}$, and thus may be performed prior to packaging the transducer.

As noted briefly above, the transducer 10 has a resonant structure 47 which includes the mass 14. The vibration of the mass is restrained by a mechanical or electrical restraint, such as a mechanical spring or electrical servomechanism, here represented by a mechanical spring-type restraint 18. It is noted that the vibration of the mass 14 will be dampened by shear viscosity between the mass 14 and the substrate 12; here, such damping being represented by a dash pot 19. Thus, the resonant structure 47 may be presented by a second order system having a normalized amplitude characteristic:

$\omega_o^2/\{[\omega_o^2-\omega^2]+j[\omega\omega_o/Q]\}$ where:

$\omega_o$ is the natural resonant frequency of the resonant structure 47;

$Q=\omega_o/BW$, where: BW is the bandwidth of the structural resonance (i.e., the 3 db bandwidth of the resonant peak);

j=the square root of −1; and $\omega$ is the vibratory frequency of the mass 14. The transfer function of such resonant structure 47 is well known.

It should be noted that while the characteristic of a second-order system has been given above, the normalized mechanical response characteristic for the specific resonant structure 47 shown in FIG. 1 may be represented as:

$\{K_D/m\}/[\{K_D/m\}-\omega^2]+j\{D/m\}\omega$ where:

$K_D$ is the stiffness of the restraint 18;

m is the mass 14; and

D is the Shear damping represented by dash pot 19.

It is noted that at resonance, $\omega_o$, the resonant structure 47 provides a 90 degree phase shift between an input vibratory direction force mechanism 22 and an vibratory axis output sensing mechanism, i.e, sensing electrodes of vibratory axis output sensing mechanism 40. During the normal operating mode, and during the test mode, the vibratory axis output sensing mechanism 40 is coupled to the input vibratory direction force mechanism 22 through the differentiator 31 and switch 15. The differentiator 31 is here made up of an amplifier having the input thereof coupled to the mass 14 though the differential capacitor output sensing electrodes of vibratory axis output sensing mechanism 40. Thus, as noted above, a positive feedback arrangement is proved to vibrate the mass 14 at the resonant frequency $\omega_o$ along the vibratory direction during both the test node and normal operating mode.

In order to test, or calibrate, the transducer 10, forces, $F_{TEST\ VIBRATORY}$ and $F_{TEST\ SENSITIVE}$, are applied simultaneously on the mass 14 along the direction of vibration (i.e., along the vibratory direction, here axis 21) and along the sensitive axis 27, respectively. The forces, $F_{TEST\ VIBRATORY}$ and $F_{TEST\ SENSITIVE}$, are applied in a predetermined ratio, N, in the absence of a deliberately applied angular rate ($\Omega_{IN}=0$) about the rate sensing axis 25 and the transducer output $V_{OUT}$ is measured. During the test mode, such output $V_{OUT}$ is designated as $V_{TEST\ OUT}$. Thus, during the test mode, $V_{TEST\ OUT}$ of the transducer 10 is measured in response to forces, $F_{TEST\ VIBRATORY}$ and $F_{TEST\ SENSITIVE}$. That is, during the test mode, force $F_{TEST\ VIBRATORY}$ is applied to the mass 14 by the input vibratory direction forcing mechanism 22, such force being generated by the positive feedback loop provided by switch 15 and the differentiator 31 around the resonant structure 47. Simultaneously, as force $F_{TEST\ VIBRATORY}$ is applied to the mass 14 along the vibratory direction, here along axis 21, the force $F_{TEST\ SENSITIVE}$ is applied to the mass 14 along the sensitive axis 27 by sensitive axis force mechanism 32. It is noted that, during the test mode, switch 13 is positioned so that the same electrical signal applied to the vibratory axis force mechanism 22 is applied to the sensitive axis force mechanism 32. As noted briefly above, both the vibratory axis force mechanism 22 and the sensitive axis force mechanism 32 are electro-statically coupled fingers. These fingers are formed in the same geometric shape with the same material, albeit ninety degrees with respect to each other. Thus, because both mechanisms 22, 32 are driven with the same electrical signals, the ratio of $F_{VIBRATORY}/F_{SENSITIVE}=N$, where N is the ratio of the number of fingers in the vibratory direction force mechanism to the number of fingers in the sensitive axis force mechanism. Here, for example, N=270.

It is noted from the characteristic the specific resonant structure 47 that near resonance, the velocity, v, of the vibrating mass 14 will be substantially $F_{VIBRATORY}/D$. Thus, $F_{COR}=2\Omega_{IN}F_{VIBRATORY}\{m/D\}$ and the input angular rate $\Omega_{IN}=F_{COR}/[2F_{VIBRATORY}\{m/D\}]$. As noted above, the proportionality constant $K=V_{OUT}/\Omega_{IN}$. Thus, $K=V_{OUT}\{2F_{VIBRATORY}\{m/D\}\}/F_{COR}$. If during a test mode, any actual input angular rate is removed from the transducer, i.e., $\Omega_{IN}=0$, and a force $F_{TEST\ SENSITIVE}$ were applied to the sensitive axis 27 in place of an actual Coriolis force, $F_{COR}$, where $F_{VIBRATORY}/F_{TEST\ SENSITIVE}=N$, K would equal $V_{OUT\ TEST}[2N\{m/D\}]$. It is noted from the 3 db point of the amplitude characteristic above, that D/m=BW. Thus, $K=V_{OUT\ TEST}[2N/BW]$. Consequently, while the parameters m and D vary from transducer to transducer because of manufacturing variations, they define a characteristic frequency, i.e., BW, when operating near resonance.

In summary, with such test method, a known test input angular rate $\Omega_{IN\ TEST\ SIM}$ is simulated by applying a force $F_{TEST\ SENSITIVE}$ along the sensitive axis, such test input angular rate $\Omega_{IN\ TEST\ SIM}$, being a known function of a measured characteristic frequency. Near resonance the characteristic frequency is the resonance bandwidth, BW. Thus, the proportionality constant $K=V_{OUT}/\Omega_{IN}=V_{OUT\ TEST}/\Omega_{IN\ TEST\ SIM}$ can be calculated prior to packaging and without the use of a rate table.

In order to determine K, a determination of BW is required. The BW of the resonant structure 47 may be determined by determining the actual frequency response of the resonant structure 47. Thus, switch 13 is open, as shown in FIG. 1, and switch 15 couples the vibratory forcing mechanism 22 to a variable oscillator 33, as shown in FIG. 1. The output, $V_{OUT\ FREQ.\ RESPONSE}$ of the differentiator is measured. The frequency of the oscillator 33 is varied about the resonant frequency $\omega_o$ while $V_{OUT\ FREQ.\ RESPONSE}$ is measured to determine the 3 db points of the peak (i.e, the bandwidth, BW) of the resonance. Thus, the proportionality constant K is determinable.

Figure 2:
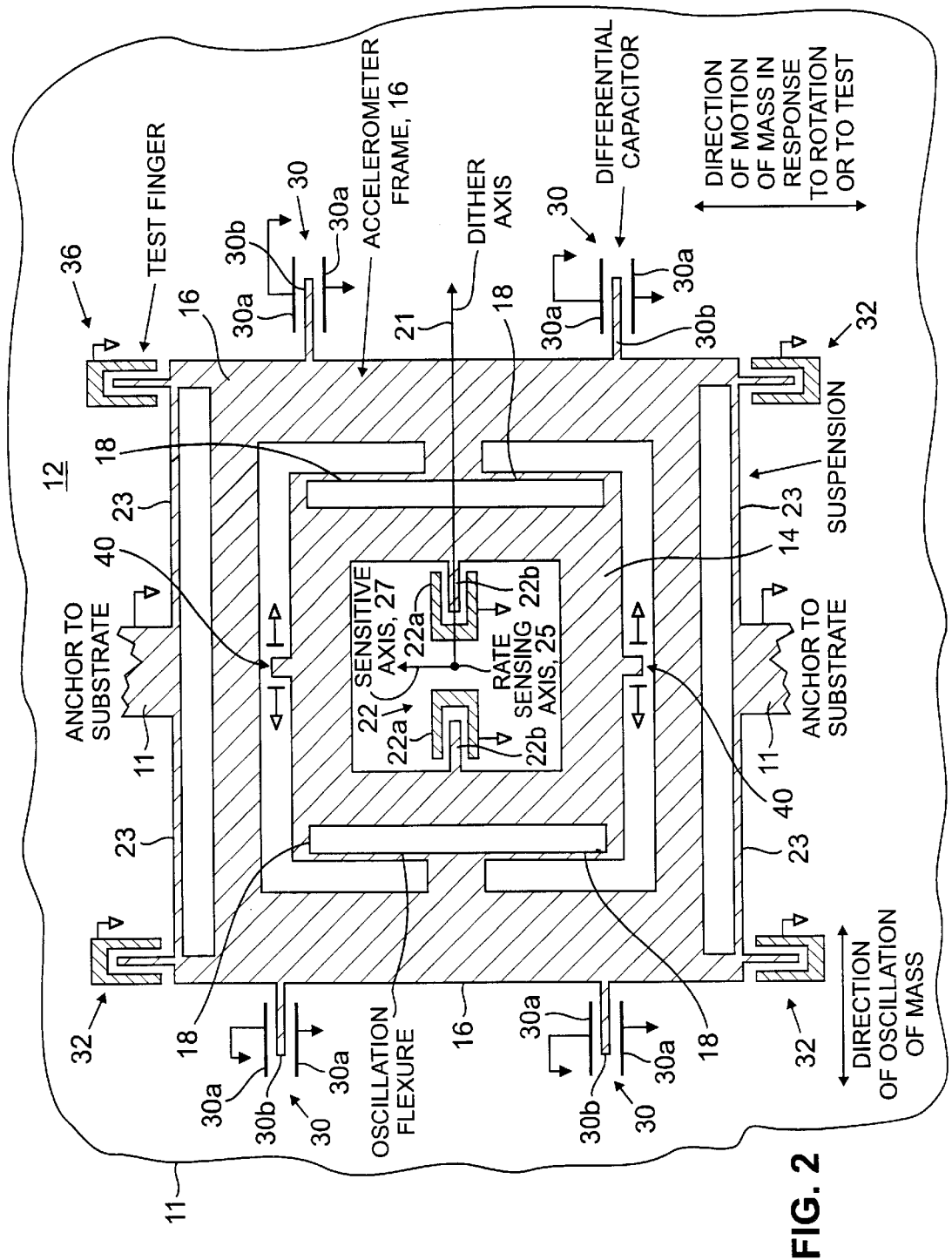
FIG. 2 is a diagrammatical plan view sketch of a portion of the transducer of FIG. 1.

Referring also to FIG. 2, the transducer 10 is shown in more detail diagrammatically to include a vibrating mass, 14, here an oscillating, or dithering, mass 14 suspended, at each of its four corners, from an accelerometer frame 16 by flexures 23 similar to those described in my co-pending patent application entitled "Micromachined Gyros" filed Sep. 2, 1997, Ser. No. 08/921,672, and now U.S. Pat. No. 6,122,661, assigned to the same assignee as the present patent application, the entire subject matter thereof being incorporated herein by reference. The frame 16 is anchored to the semiconductor substrate 12 at anchor points 11, as indicated. The mass 14 is arranged to dither, or oscillate, (i.e, oscillate or vibrate) along a vibratory direction, here axis 21, by electrical attraction of drive fingers of the vibratory direction force mechanism 22 in response to an alternating current fed to such drive fingers of the vibratory direction force mechanism 22 by either the output of the differentiator 31 during the normal or test modes, or by oscillator 33 when the frequency response of the resonant structure is being measure to determine the resonant bandwidth, BW. More particularly, one set 22a of the drive fingers used for the vibratory direction force mechanism 22 is anchored to the substrate 12 and, interdigitated therewith, is a second set 22b of the drive fingers used for the vibratory direction force mechanism 22 integrally attached to the mass 14. The alternating current electrical signal is applied through an electromechanical arrangement, the equivalent circuit thereof being shown in FIG. 2. Suffice it to say here that the drive fingers of the vibratory direction force mechanism 22 cause set 22b to oscillated relative to set 22a along vibratory axis 21. Thus, the mass 14 dithers along the vibratory axis 21 at a frequency established by the electromechanical arrangement shown in FIG. 2 which provides the alternating current to the drive fingers of the vibratory direction force mechanism 22. During the test and normal modes, the frequency of the alternating current is the same as the mechanical resonant frequency, $\omega_o$, of the suspended mass 14.

The frame 16 is restrained from movement relative to the substrate 12 along the vibratory axis 21 by suspension flexures 23. The frame 16 is anchored to the substrate 12 at points 11. The mass 14, suspended within an interior region of the frame 16, is arranged to move relative to the frame 16 along the vibratory axis 21 independent of movement of the frame 16. Further, the frame 16 and the mass 14 are restrained from movement along a sensitive axis 27 unless such frame 16 and mass 14 move along the sensitive axis together because of the restraining effect of the flexures 18, 23.

When the mass 14 is dithered relative to the substrate by a dither drive signal applied to the dither fingers of the vibratory direction force mechanism 22, and an angular rate $\Omega_{IN}$ is applied to the substrate along a rate sensing axis 25 perpendicular to both the vibratory axis 21 and the sensitive axis 27, a Coriolis force, $F_{COR}$ (i.e., Coriolis acceleration, $A_{COR}$) is applied to the mass along the sensitive axis 27. This Coriolis force is coupled by the spring-like suspension flexures 18 from the mass 14 to the frame 16 along the sensitive axis 27. The displacement of the mass 14, y, along the sensitive axis 27 is a function of both the angular rate $\Omega_{IN}$ of the mass 14 about the rate sensing axis 25 and the compliance of the spring-like restraint of flexures 23. Thus, for an angular rate $\Omega_{IN}$, the mass 14 and frame 16 will move together along the sensitive axis 27. The frame 16 will be displaced a distance y along the sensitive axis 27. This distance y causes a change in the capacitance between the output sets of fingers of sensitive axis output sensing mechanism 30. The output fingers of sensitive axis output sensing mechanism 30 have one set 30a thereof anchored to the substrate 12 and an interdigitated set 30b integrally formed with the frame 16, as indicated, to form a differential capacitor. This change in capacitance is detected by electronic signal conditioning circuitry 28 shown in FIG. 2 and formed on the substrate 12 as an integrated circuit along with the mechanical portion of the transducer shown in FIG. 1. The signal conditioning circuitry 28 (FIG. 2) produces an output electrical signal, $V_{OUT}$ (or $V_{TEST\ OUT}$ during the test mode), either a voltage or current. Thus, a scale factor K represents the ratio of output signal level $V_{OUT}$ to input rate $\Omega_{IN}$.

It should be noted that the response to the applied force depends on the correct functioning of the oscillator loop involving differentiator 31, vibratory axis output sensing mechanism (i.e., pickoff) 40, input vibratory direction force mechanism (forcer) 22 and resonant structure 47 because that loop provides the correct form of drive for the sensitive axis force mechanism (i.e., test forcer) 32. The response also depends on the functioning of the sensing electrodes of sensitive axis output sensing mechanism (i.e., Coriolis accelerometer sensor) 30 and its signal conditioning circuitry 28. If any of these is inhibited, even partially, the response will be quantitatively incorrect. Thus, by switching on the self test and checking the magnitude of the incremental change in output voltage, the complete function of the device can be verified. This is a great benefit in safety applications.

Figure 3A:
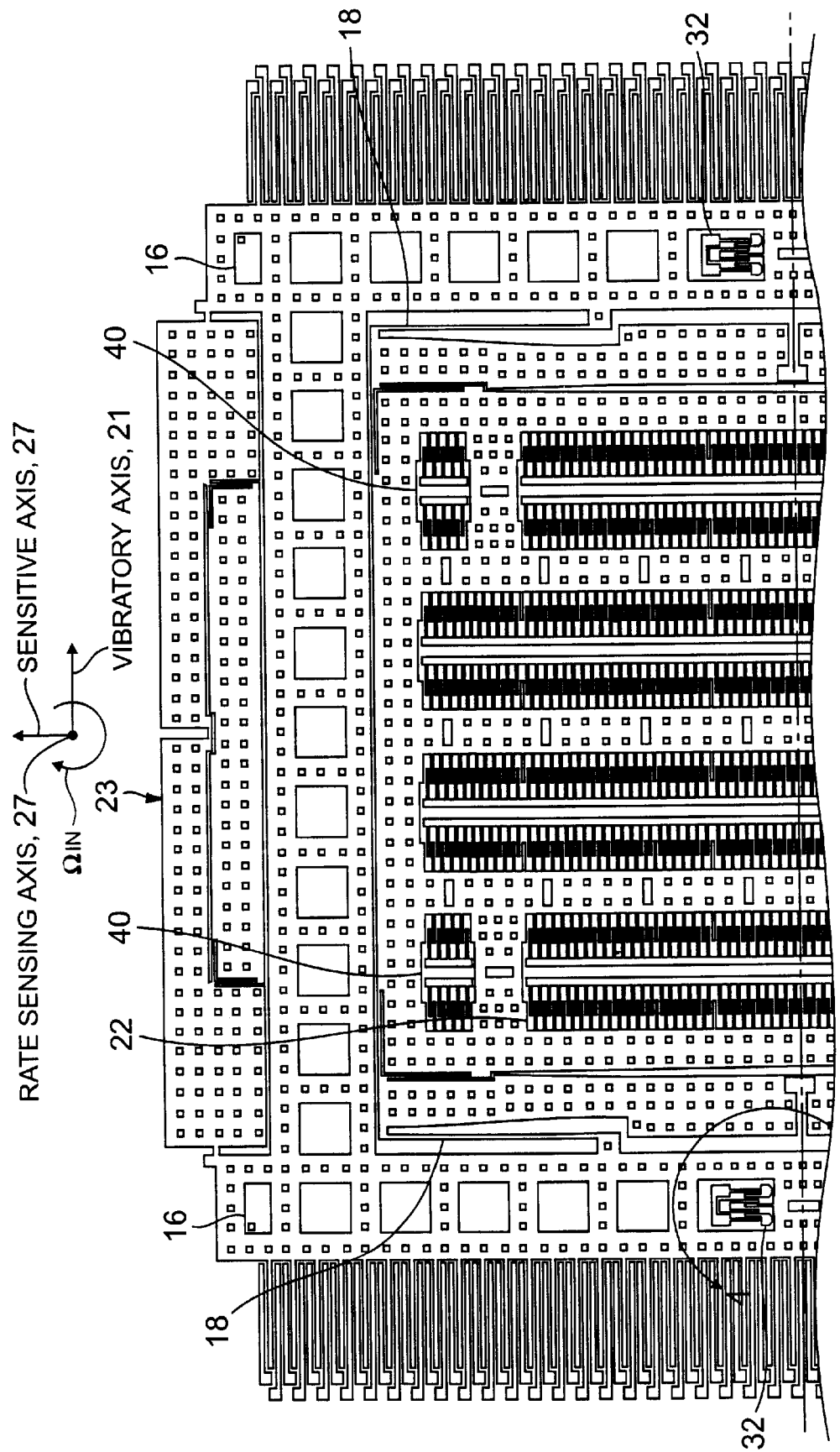
FIG. 3 is a plan view of a Coriolis transducer according to the invention.
Figure 3B:
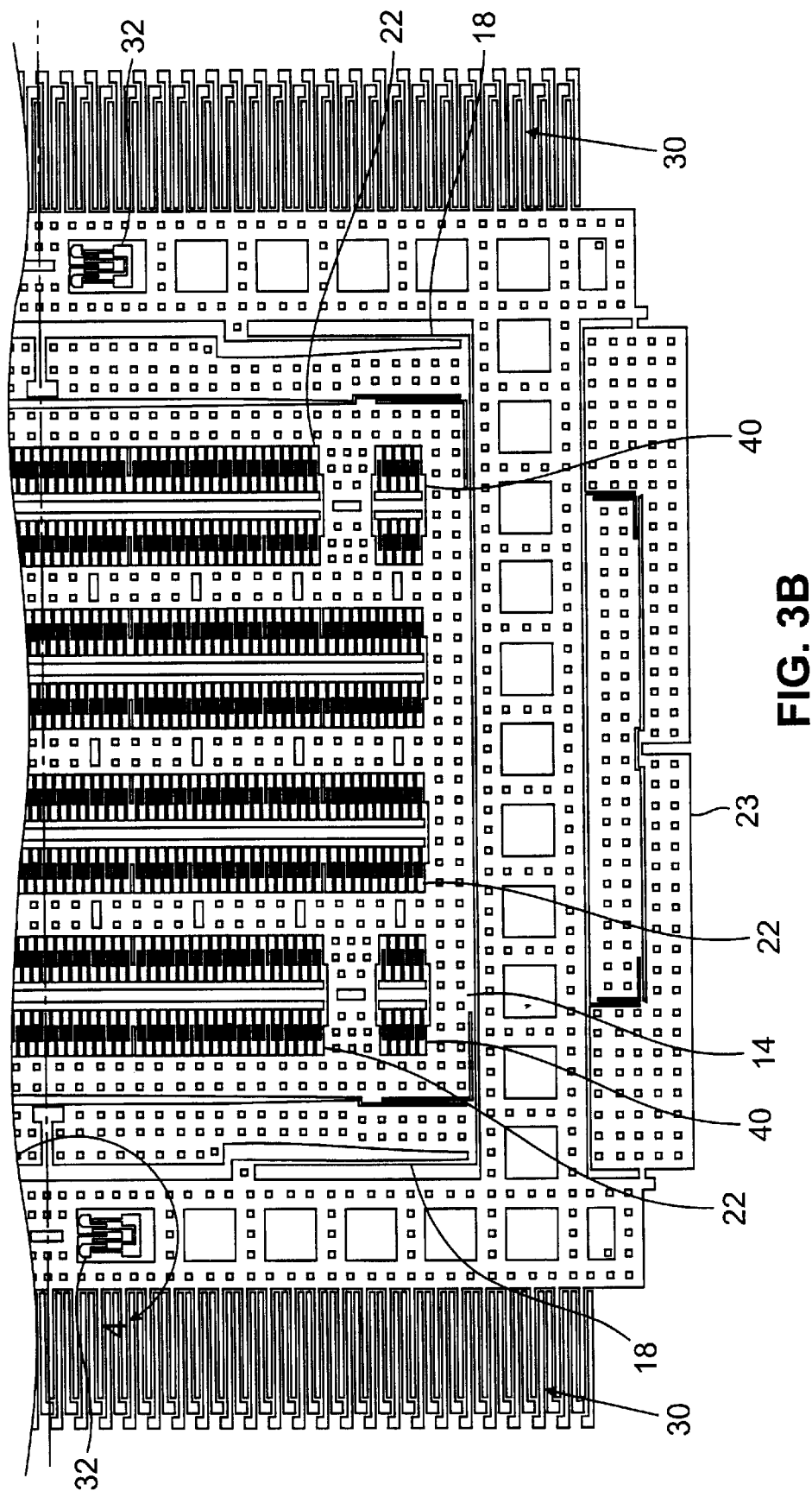
Figure 4:
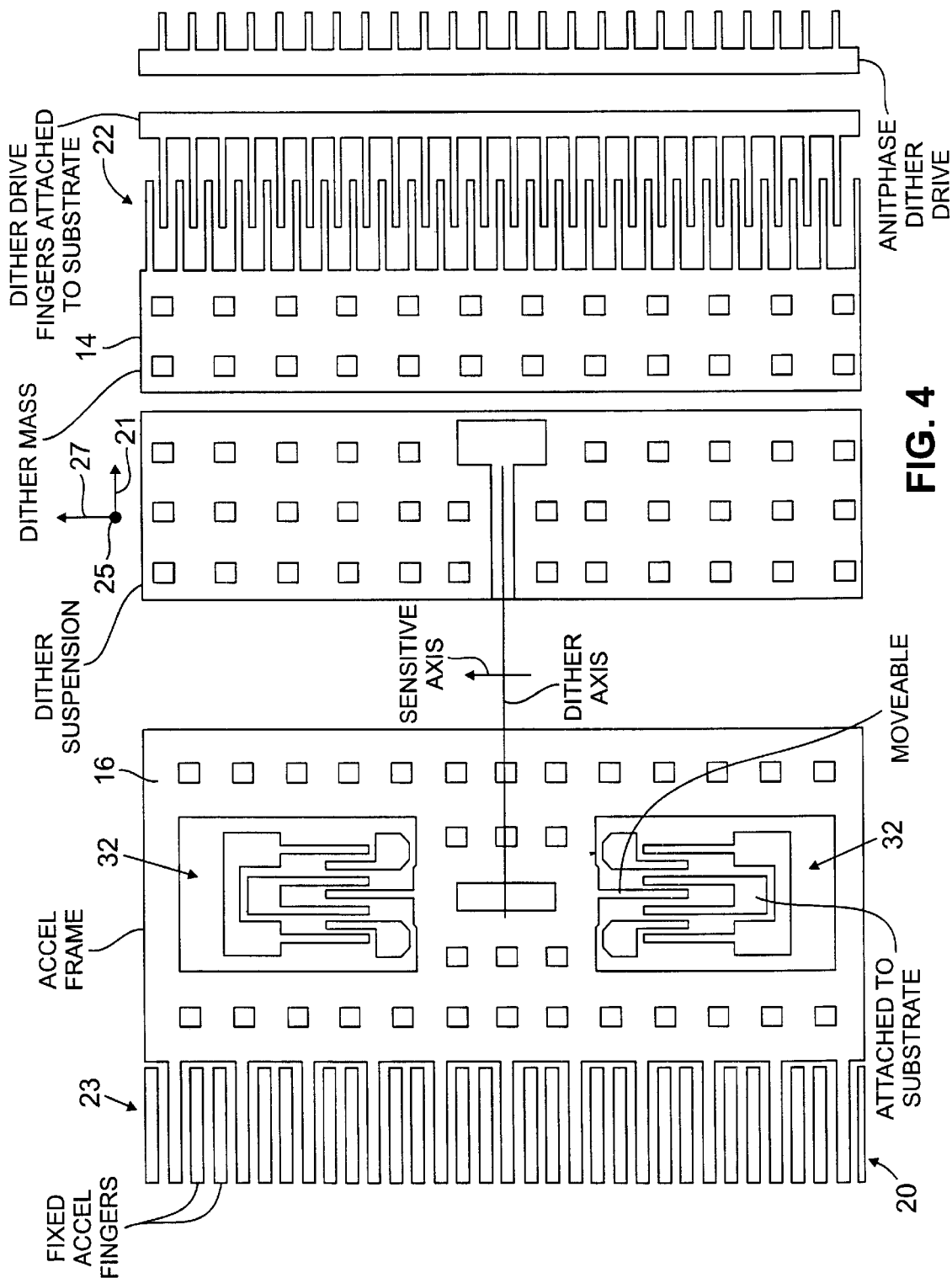
FIG. 4 is a plan view of an enlarged portion of the transducer of FIG. 3, such portion being enclosed by the circle labelled 4—4 in FIG. 3.

Referring now to FIGS. 3 and 4, it is noted that the transducer is micromachined with the mechanism used to apply the vibratory direction force, $F_{TEST\ VIBRATORY}$, on the mass and the mechanism used to apply the force to the mass along the sensitive axis, $F_{TEST\ SENSITIVE}$, in proximate regions of the transducer so that they have matched physical and electrical characteristics. Thus, manufacturing variations incurred in the formation of one of the force mechanisms occur to the other one of the force mechanisms with their size ratio being independent of such manufacturing variations. Thus, with the sensitive axis and vibratory direction forces ratio, N, related to the ratio of the sizes of the mechanisms, rather than to the absolute size of each one of the mechanisms, such ratio, N, can easily and accurate determinable. Here, the force mechanism is an electrostatically driven finger, thus N is merely the ratio of the number of fingers to produce $F_{TEST\ VIBRATORY}$ to the number of fingers used to produce $F_{TEST\ SENSITIVE}$. Here, the test fingers used to produce $F_{TEST\ SENSITIVE}$ has only one active finger, the other fingers are provided to produce the same electro-static fringing field effects on the active finger as produced on the fingers used to produce the force $F_{TEST\ VIBRATORY}$. Thus, because of the matched drives, and since the calibration process need only knowledge of the ratio of the forces rather than a knowledge of the absolute magnitude of such forces, an accurate determination of the proportionality constant, K is achieved.

Figure 5:
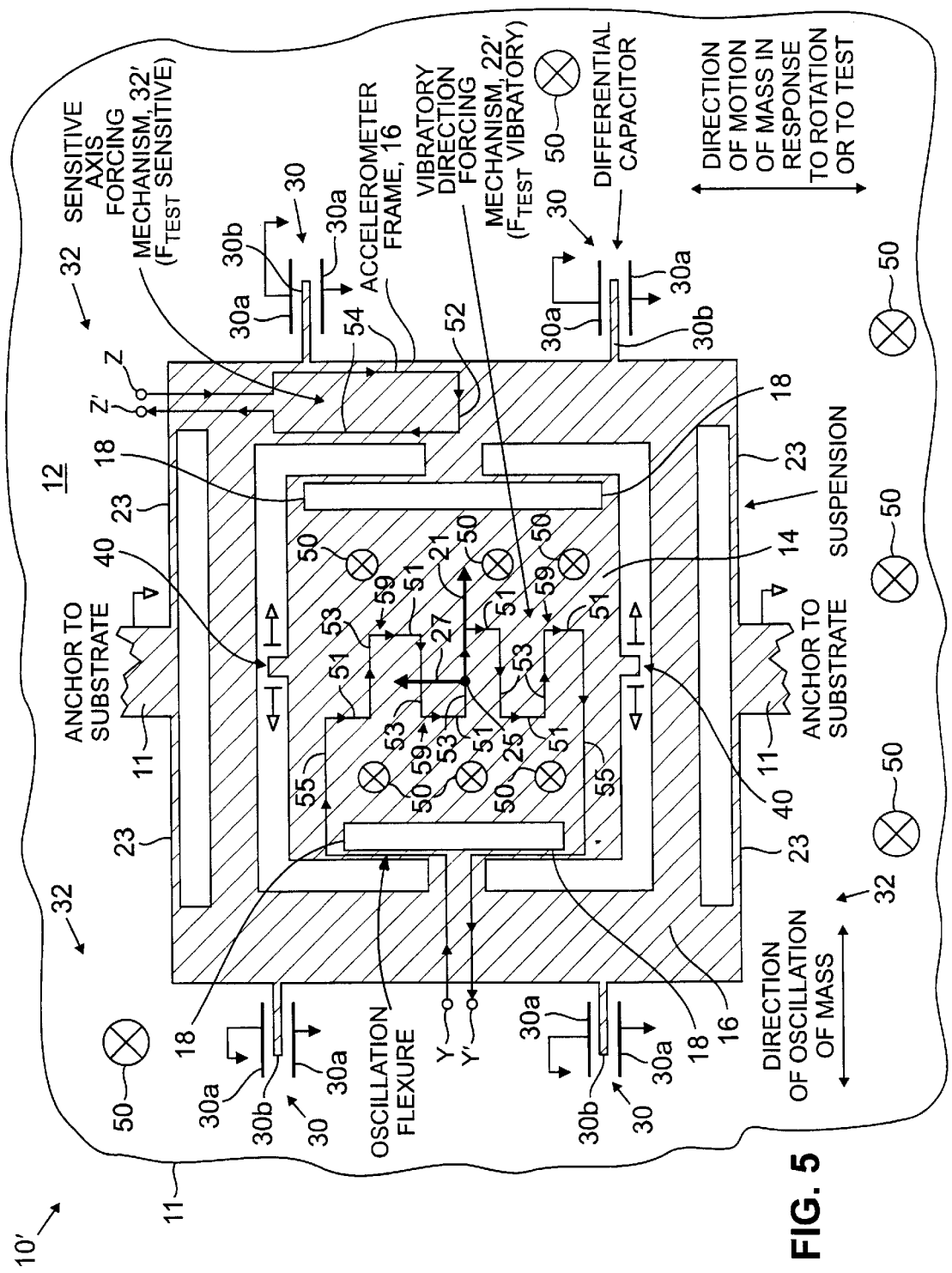
FIG. 5 is a schematic diagram useful in understanding the operation of a Coriolis transducer according to an alternative embodiment of the invention.
Figure 6:
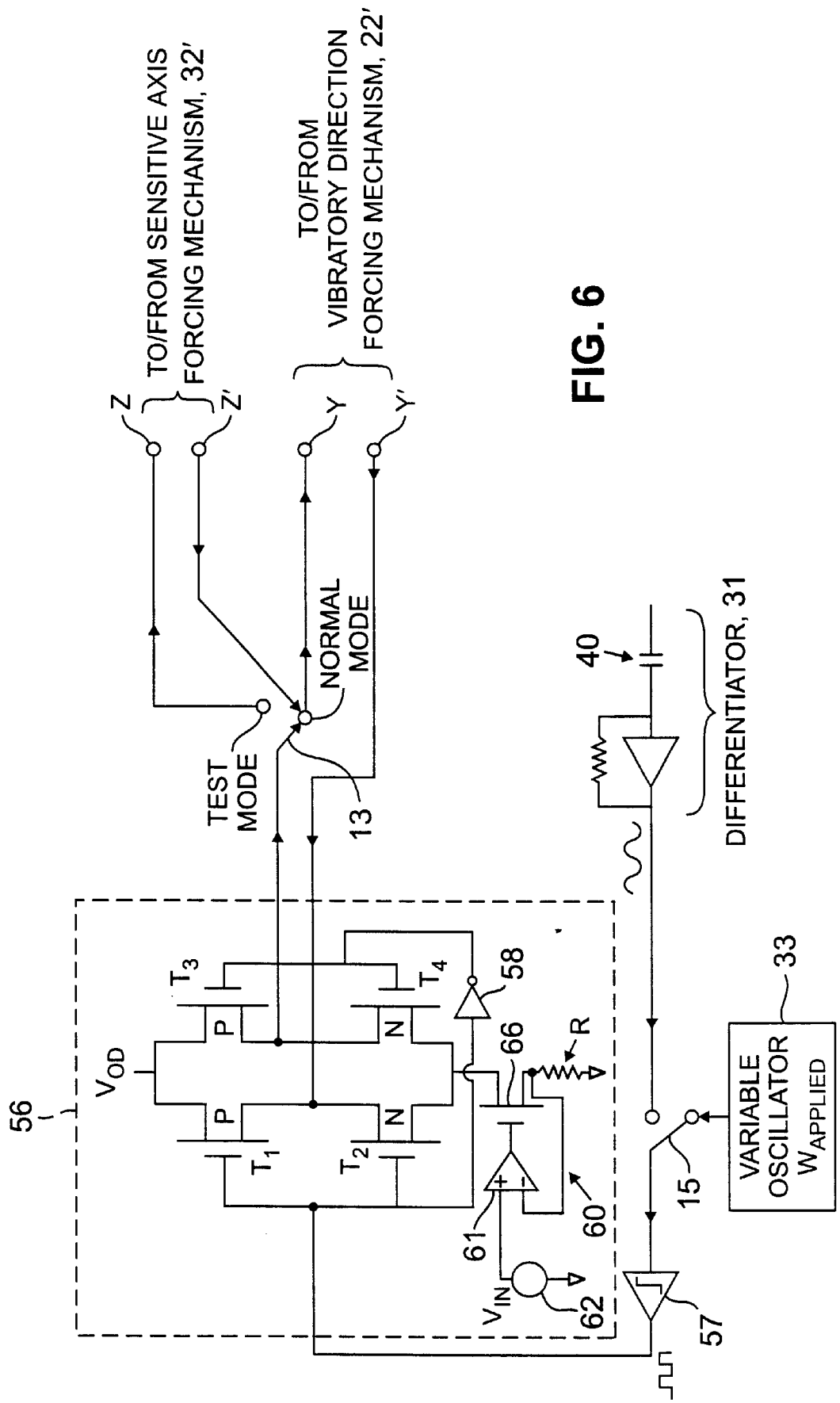
FIG. 6 is a schematic diagram of circuitry used to drive a sensitive axis forcing mechanism and a vibratory direction forcing mechanism of the transducer of FIG. 5.

Referring now to FIGS. 5 and 6, an alternative embodiment of a Coriolis transducer, here an electro-magnetically actuated transducer 10' is shown. It is first noted that the transducer 10' has elements which are the same as those used in transducer 10 and such common elements are indicated by the same numerical designation used in connection with transducer 10. Here, however, instead of having an electro-static vibratory direction forcing mechanism 22 and an electro-static sensitive axis forcing mechanism 32, as with transducer 10, the transducer 10' uses an electromagnetic vibratory direction forcing mechanism 22' and an electromagnetic sensitive axis forcing mechanism 32', respectively.

More particularly, a magnetic field is produced by any convenient means, not shown, such as a permanent magnet, along the rate sensing axis 25 (i.e., the magnetic field is perpendicular to the plane of FIG. 5 and is represented in FIG. 5 by the ⊗ and numerical designation 50). The vibratory direction forcing mechanism 22' includes a plurality of, here N, current carrying conductive segments 51, each having a length, L. (Here, only six segments 51 are for purposes of understanding the invention, it being understood that a larger number can be used.) The plurality of current carrying conductive segments 51 are disposed on the accelerometer frame 16 along direction of the sensitive axis 27, as indicated. The segments 51 are electrically connected in series by conductors 53, as indicated, with the first and last one of the segments 51 being connected to terminals Y, Y', by conductors 55, as indicated. As will be described in more detail in connection with FIG. 6, an alternating current is fed to the segments 51 during both the normal and test modes via terminals Y, Y'. The effect of the magnetic field 50 on the alternating current through the segments 51 to the generate a vibratory force, $F_{VIBRATORY}$ on the segments 51 along the vibratory axis 21. The vibratory force thereby causes the accelerometer frame 16 to vibrate along the vibratory axis 21. During the test mode the vibratory force is the force $F_{TEST\ VIBRATORY}$. In both the test and normal modes, force on the segments 51 is proportional to the magnetic field, the current and the length of the segments 21. Here, each one of the N segments 21 has the same length, L.

The sensitive axis forcing mechanism 32' includes a current carrying conductive segment 52, having a length L, coupled to terminals Z, Z' by conductors 54, as indicated. It should be understood that while only one segment 52 is shown for convenience in understanding the operation of the transducer 10' additional segments can be used. The segment 52 is disposed on the accelerometer frame 16 along the vibratory axis 21, as indicated. As will be described in more detail in connection with FIG. 6, an alternating current is fed to the segment 52 during the test mode via terminals Z, Z'. The effect of the magnetic field 50 on the alternating current through the segment 52 is to the generate the force, $F_{TEST\ SENSITIVE}$ on the segment 52 along the sensitive axis 27. The force $F_{TEST\ SENSITIVE}$ on the segment 52 is proportional to the magnetic field, the current and the length of the segment 52. Here, as noted above, the segment 52 has the same length, L, as each one of the segments 51.

It is noted that, as was the case with the fingers used to produce the electro-static forces for the transducer 10, the segments 51 and 52 are formed in the same geometric shape, with the same material, and with the same process, albeit ninety degrees with respect to each other. Thus, because both mechanisms 22', 32' are driven with the same electrical signals, here current from source 56 to be described in more detail in connection with FIG. 6, the ratio of $F_{VIBRATORY}/F_{SENSITIVE}=N$, where N is the ratio of the number of segments 51 in the vibratory direction force mechanism to the number of segments 52 in the sensitive axis force mechanism.

The terminals Y, Y' and Z, Z' are coupled to a high output impedance alternating current source 56 (FIG. 6) through test mode/normal mode switch 13. The high output impedance alternating current source 56 includes a pair of CMOS transistors $T_1$, $T_2$ and $T_3$, $T_4$, as indicated. Here, CMOS transistors $T_1$ and $T_2$ are N and P channel transistors, respectively, and CMOS transistors $T_3$ and $T_4$ are N and P channel transistors, respectively. The gates of transistors $T_1$ and $T_2$ are connected to one output terminal of switch 15, as indicated. The gates of transistors $T_3$ and $T_4$ are connected to the gates of transistors $T_1$ and $T_2$ though an inverter 58 and also to one output terminal of switch 15 though a comparator 57, as indicated. One input of the switch 15 is connected to the variable oscillator 33, and the other input of the switch 15 is connected to the differentiator 31. The comparator 57 is used to convert the sinusoidal signal produced by the oscillator 33 and by the differentiator 31 into logic level signals for the CMOS transistors $T_1$–$T_4$. The output variable oscillator 33 is coupled to current source 56, via comparator 57 and switch 15, when the frequency response of the resonant structure is being measure to determine the resonant bandwidth, BW. The output of the differentiator 31 is coupled to the current source 56, via comparator 57 and switch 15, during both the normal and test modes.

The drains of the transistors $T_1$ and $T_3$ are connected to a dc power source VDD, as indicated. The source of transistors $T_2$ and $T_4$ are connected to a current source 60. The current source 60 includes a reference voltage source 62 coupled to the non-inverting input of a differential amplifier 64. The output of the amplifier 64 is coupled to the gate of MOSFET 66. The drain of MOSFET 66 is coupled to the source of transistors $T_2$ and $T_4$, as indicated. The drain of MOSFET 66 is coupled to a reference potential through a high impedance resistor R and is fed back to the inverting input of the amplifier 64, as indicated. Thus, the feedback arrangement drives the amplifier 64 to maintain a fixed voltage across the resistor R resulting in a constant current through such resistor R.

During one half cycle of the sinusoidal signal produced by the differentiator 31 (FIG. 6)or oscillator 33, transistors $T_1$ and $T_4$ are on while transistors $T_2$ and $T_3$ are off. During the other half cycle the off and on states are reversed. Thus, an alternating current is forced through terminals Y, Y'. During the test mode that same current is forced through terminals Z, Z' as well as Y, Y'. The magnitude of the current is defined by the source 60 during both half cycles and during all modes, normal, test and B/W determining.

Referring to FIG. 5, the effect is to produce an alternating current through the segments 51 of the vibratory direction forcing mechanism 22' during both the test and normal mode. The effect of the magnetic field 50 on this current is to produce a vibratory force on the accelerometer frame along the vibratory direction 21. It is noted that the direction of current through alternating segments of the conductors 53 alternate so that any magnetic field effects produced by the conductors 53 cancel. During the test mode that same current also passes through segment 52 producing a test force while the forces from the paired connecting conductors 54 cancel. It is noted, however, that there are fringing effects at the ends 59 of the segments 51. These effects are the same as the fringing effects at the ends of segment 52 because they are the same length and form. Thus, because of the matched drives, here electromagnetic drives, and since the calibration process needs only knowledge of the ratio of the forces rather than a knowledge of the absolute magnitude of such forces, an accurate determination of the proportionality constant, K is achieved.

Other embodiments are within the spirit and scope of the invention. For example, when the applied frequency, $\omega_{APPLIED}$, is less than the natural resonant frequency, $\omega_o$, the simulated $\Omega_{IN\ TEST\ SIM}=\{\omega_o^2\}/\{2N\omega_{APPLIED}\}$. In that case, the natural frequency $\omega_o$ is measured and used for the calibration is the natural frequency $\omega_o$ (i.e., the characteristic frequency of the resonant structure measured and used for the calibration is the natural frequency $\omega_o$). More particularly, the proportionality constant $K=V_{TEST\ OUT}/\Omega_{IN\ TEST\ SIM}=\{2N\omega_{APPLIED}/\omega_o^2\}\{V_{TEST\ OUT}\}$ is determined when the vibratory direction and sensitive axis forces, $F_{TEST\ VIBRATORY}$ and $F_{TEST\ SENSITIVE}$, respectively, are applied to the transducer in ratio, N, with $\Omega_{IN}=0$, and $V_{OUT\ TEST}$ is measured. When the applied frequency, $\omega_{APPLIED}$, is greater than the natural resonant frequency, $\omega_o$, the simulated $\Omega_{IN\ TEST\ SIM}=\omega_{APPLIED}/2N$. In that case, the characteristic frequency used for the calibration is $\omega_{APPLIED}$. More particularly, the proportionality constant $K=\{2N/\omega_{APPLIED}\}\{V_{TEST\ OUT}\}$ is determined when the vibratory direction and sensitive axis forces, $F_{TEST\ VIBRATORY}$ and $F_{TEST\ SENSITIVE}$, respectively, are applied in ratio, N, to the transducer, with $\Omega_{IN}=0$, and $V_{OUT\ TEST}$ is measured.

What is claimed is:

1. A method for testing a Coriolis transducer having a mass vibrate along a vibratory direction in a resonant structure and undergo a displacement along a sensitive axis, perpendicular to the vibration, in response to an angular rate about a rate sensing axis, such displacement being perpendicular to both the vibration and the rate sensing axis, such method comprising:

applying forces, $F_{TEST\ VIBRATORY}$ and $F_{TEST\ SENSITIVE}$, on the mass along the direction of vibration and along the sensitive axis, respectively, in a predetermined ratio, N; and, measuring an incremental output $V_{OUT\ TEST}$ of the transducer in response to the forces, $F_{TEST\ SENSITIVE}$ and $F_{TEST\ VIBRATORY}$.

2. The method recited in claim 1 wherein the mass is included in a resonant structure and the method includes measuring a characteristic frequency of the resonant structure.

3. The method recited in claim 2 wherein the resonant structure is a second-order resonant structure having an amplitude characteristic related to:

$$[\omega_o^2-\omega]+j[\omega\omega_o/Q]$$

where:

$\omega_o$ is the natural resonant frequency of the resonant structure;

$Q=\omega_o/BW$, where: BW is the resonant bandwidth of the structural resonance;

$j$=the square root of $-1$;

$\omega$ is the vibratory frequency of the mass;

and wherein the measured characteristic is the resonant bandwidth, BW.

4. The method recited in claim 2 wherein the characteristic frequency of the resonant structure is determined by applying a known vibratory frequency, or frequencies, to the mass within the resonant structure.

* * * * *